Figure 1:
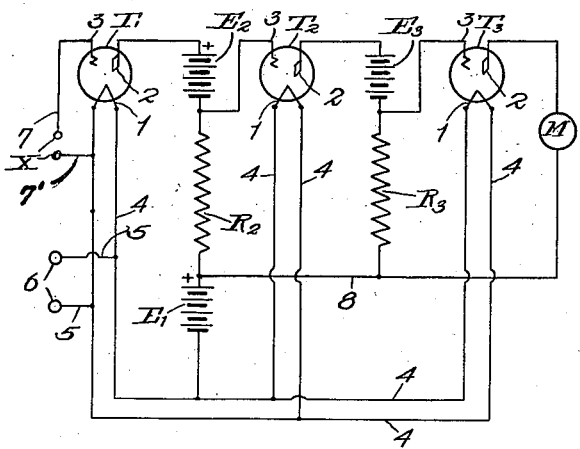

Feb. 2, 1932.　　　K. H. GOODE　　　1,843,320

ELECTRIC METER

Filed Jan. 28, 1926

Inventor
Kenneth H. Goode
By Martin T. Fisher,
Attorney

Patented Feb. 2, 1932

1,843,320

UNITED STATES PATENT OFFICE

KENNETH H. GOODE, OF STATE COLLEGE, PENNSYLVANIA

ELECTRIC METER

Application filed January 28, 1926. Serial No. 84,529.

My invention relates to measuring devices and more particularly to a meter for indicating electrode potentials, especially of sources of small voltage.

An object of my invention is to provide a meter which will indicate electrode potentials of various types of cells without drawing an appreciable current from the cell.

Another object of my invention is to provide a measuring device which makes use of the amplifying characteristics of the vacuum tube to magnify the currents so that they can be measured with a milliammeter.

Yet another object of my invention is to provide a continuous reading volt meter for work on hydrogen-ion concentration which can be directly calibrated in Sorensen units.

Still another object of my invention is to provide a measuring device which is conveniently used in connection with routine titration work since by means of this device the acidity of any vat in a chemical plant may be indicated on a dial in the chemist's or superintendent's office.

A still further object of my invention is to provide a measuring device in which any changes in the concentration in titration cells may be readily followed on the meter without making any adjustments of the apparatus.

With these and other objects in view, which may be incident to my improvements, the invention also resides in improved details that will be explained by reference to the accompanying drawings illustrating the preferred embodiment of the invention.

Figure 2:
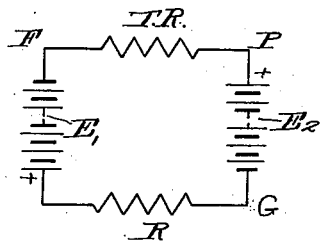
Figure 3:
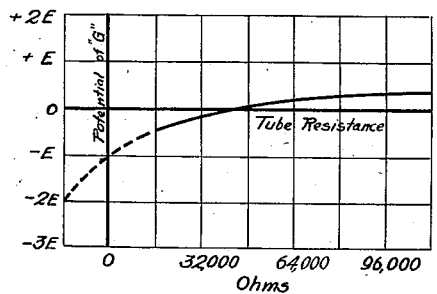
Figure 4:
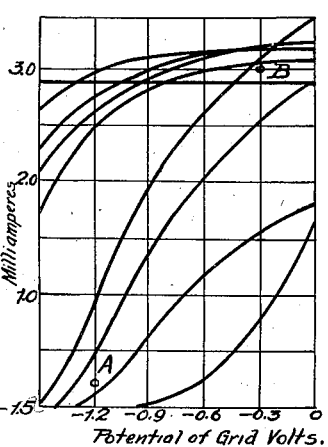
Figure 5:
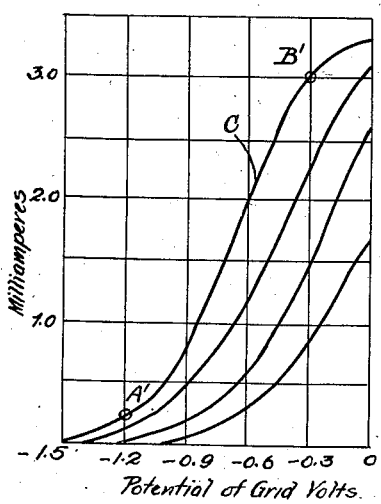

In the drawings:

Figure 1 is a diagrammatic view of a circuit illustrating the principle of my invention, Fig. 2 shows a wiring diagram arranged to make use of the principle shown in Fig. 1, Fig. 3 is a characteristic curve showing the relation between the grid potential and the tube resistance of a thermionic tube, Fig. 4 shows a curve representing the changes produced by varying the potentials of the three batteries, and Fig. 5 is a curve showing the result obtained by means of slight adjustment of the filament current.

A continuous reading volt meter for indicating electrode potentials in various types of cells without drawing sufficient current from the cell to disturb the equilibrium is desirable for many electro-chemical investigations and measurements and is particularly needed in work on hydrogen-ion concentration.

The simplest possible apparatus for electrometric titration, from a theoretical standpoint, would be a sensitive volt meter connected between a calomel electrode and a hydrogen electrode. In practice, however, an ordinary volt meter cannot be used because the instrument would consume current enough from the cell to discharge the hydrogen electrode and render it inoperative. For this reason many types of apparatus in present use depend upon balancing the unknown E. M. F. of the cell being used, against a variable known E. M. F. produced by a potentiometer system, the balance being determined by a "null-point" galvanometer. With this type of apparatus a balance of potentials must be made before each reading of the voltage and there is considerable uncertainty in the readings when the potential of the cell is rapidly changing.

My measuring device consists essentially of a three-electrode vacuum tube used as a volt meter and as a direct current amplifier. The amplified current serves to indicate upon the scale of a milliammeter the potential between any two electrodes ordinarily used in electro-chemical work.

It has been proposed to use an apparatus which renders unnecessary the tapping key and balance of potentials ordinarily required and which yields continuous indication of the potentials between a hydrogen and a calomel electrode without drawing an appreciable current from the source. However, in apparatus of the type mentioned it is necessary to use a galvanometer and readings are made with a telescope and scale.

In order to avoid the use of a telescope and scale, which is inconvenient for routine titration work, it has been found possible to make use of the amplifying characteristics of the vacuum tube, to magnify the currents to such a value that they can be easily measured with a milliammeter. This meter can be calibrated directly in Sorensen units and as the action of the device is continuous any changes in the hydrogen-ion concentration in the titration cell may readily be followed on the meter without making any adjustment of the apparatus.

Referring to Figure 1 of the drawings, the tubes and resistances are shown connected in a circuit showing the principle of my invention. It will be seen that if $E^1 = E^2$ and the resistance of the tube is equal to the external resistance R the potential of the point G will be zero with respect to the point F. Changing the tube resistance produces changes in the potential of G with respect to F which lie along the fairly straight asymptotic portion of an hyperbola. This potential thus bears nearly a linear relation to the tube resistance which in turn is an almost linear function of its grid. If the point G is then connected to the grid of the succeeding tube the plate current of each tube will bear a nearly linear relation of the potential X of the grid of the first tube. It is for this reason that the meter in the plate circuit of the last tube will yield a nearly uniform scale.

Referring to Figure 3 of the drawings, I have shown the curve obtained by changing the tube resistance from 16,000 to 112,000 ohms (corresponding to plate currents from 3 to .2 milliamperes). It will be seen that the change of the tube resistance as above indicated produces changes in the potential of the point G with respect to point F which lie along the fairly straight asymptotic portion of the hyperbola. The curve of Figure 3 holds good only when $E^1$ equals $E^2$. If these potentials are not the same, the curve is shifted and the potential of the point G with respect to F can be changed to any convenient value by adjusting these potentials.

Referring to Fig. 2 of the drawings, I have shown a circuit arranged to make use of the principles illustrated in Fig. 1. The circuit as shown comprises the thermionic tubes $T^1$, $T^2$ and $T^3$. Each tube consists of a heated electron-emitting filament 1, a plate 2 and an auxiliary grid electrode 3. The hot cathodes 1 give off electrons which due to the electric field set up between the anodes 2 and the cathodes are driven across the evacuated space and strike the anodes, thereby causing a current of electrons to flow between these elements. A high voltage battery connected between the plate and the filament produces a current through the plate surface whose magnitude is a function of the potential of the grid. This plate current $I^p$ may be considered as the sum of a constant current $I^0$ which is independent of the grid potential, and a current $I^p - I^0$ which is nearly a linear function of the grid potentials, connection being made from a positive point on the battery to the filament circuit by means of a jumper, as is customarily practised in the art. Any suitable filament voltage may be obtained by varying the jumper contact, and suitable resistors may be substituted for the original members in order to restore the circuit balance.

Since the current $I^p - I^0$ which is to be amplified varies from $12 \times 10^{-5}$ amperes to 0, it will be seen that an amplification of about 25 times is necessary to give currents ranging from $3 \times 10^{-3}$ amperes to 0. Such an amplification can be easily obtained by using two vacuum-tube amplifiers, making a total of three in the apparatus.

The filaments 1 are connected in parallel through suitable leads 4 and 5 to the terminals 6 to which is connected a source of E. M. F. adapted to heat the filaments. The terminals at X, to which the unknown voltage to be measured is attached, are connected by means of leads 7 and 7' to the grid 3 and the filament connection 4 respectively, of the first tube $T^1$. A battery or other source of E. M. F., $E^2$ is connected between the plate 2 of the tube $T^1$ and the grid 3 of the tube $T^2$. There is also another battery $E^3$ connected between the plate 2 of the tube $T^2$ and the grid 3 of the tube $T^3$.

In order to amplify the plate current of the first tube it is necessary to have the grid potential of each tube affected in some way by the variation in plate current of the preceding tube. For this purpose resistances $R^2$ and $R^3$ are used, each of which has a value approximately equal to the external plate-to-filament resistance of the tubes. The resistance units $R^2$ and $R^3$ are connected with the batteries $E^2$ and $E^3$, and they are also, by means of suitable leads 8, connected to a terminal of an indicating instrument M. The other terminal of this instrument is connected by means of the lead 9 to the plate 2 of the tube $T^3$. A battery or other suitable source of potential $E^1$ is connected to the resistance unit $R^2$ and the filament connection 4 of the tubes; this source of potential may also be used to heat the filaments of the tubes.

The meter M used in this circuit is a standard portable milliammeter having a range of 0–3 milliamperes, with a 60 line scale. The milliammeter may itself be used as a volt meter, if desired by adding more resistance to the meter. The meter will then read directly 0–3 volts instead of 0–3 milliamperes. Used as a volt meter in this way the same meter can be employed not only in checking the calibration but also in regulating the filament voltage to a suitable value.

Referring to Figure 4, I have shown the changes produced by varying the potentials of the three batteries and Figure 5 shows how a slight adjustment of the filament curve helps to secure a curve of the form desired.

For electro-titration a straight line passing through the two points A, B and A', B' of Figures 4 and 5 is the ideal calibration curve. Actually a curve resembling C in Figure 5 is perfectly satisfactorily yielding a nearly uniform scale on the meter.

This apparatus although developed for use in electrode titration is by no means limited to this field. By suitable adjustment of the batteries the meter may be made to change from zero to its full scale reading, when the unknown grid potential changes from about 3 volts to zero or a change of half a volt or more anywhere within this range may be made to produce the same effect. It will thus be found most useful in investigating electrode potentials and overloads in connection with electrolytic processes of all kinds. Under conditions where the potentials to be measured are temporary or unsteady in nature, this apparatus will be found particularly useful because of its continuous and direct reading features.

By way of summary it may be stated that I have provided a measuring device which by making use of the three electrode vacuum tubes as a volt meter and as a direct current amplifier serves to indicate upon the scales of a milliammeter the potential between any two electrodes ordinarily used in electro-chemical work. This device does not draw an appreciable current from the source to be measured and is continuous and automatic in its operation. It is particularly adapted for use in electro-titration.

While I have shown and described the preferred embodiment of my invention, it should be understood that such showing is only illustrative and that the inventive idea may be carried out in other ways.

I claim as my invention:

1. In an instrument for measuring hydrogen ion concentration, an electron tube, independent sources of potential in the plate circuit of the tube, a resistor in series between the sources of potential, a second tube, means connecting the grid in series with the resistor and one of the sources of potential, means connecting the plate in series with the same source of potential, and means in the plate circuit to indicate current flow.

2. In an instrument for measuring hydrogen ion concentration, a relay including a plurality of electron tubes, the input circuit of the first tube adapted to be connected to a solution to be measured, means in the plate filament circuit of said tube connected to the grid and plate of a succeeding tube, said means including a source of potential for said plate circuit and an associated source of potential common to all the plate circuits, and a resistor connected between said sources of potential.

3. In an instrument for measuring hydrogen ion concentration, a plurality of electron tubes, an independent source of potential in series with a resistor for each adjacent pair of tubes, the plate and grid of adjacent tubes being connected together so that the grid is in series with the source of potential and the resistor between the tubes, another source of potential in series with the resistor and source of potential between the first two tubes so that said last mentioned resistor is between the two sources of potential, the second mentioned source of potential between the first two tubes being a common source for the plate circuits of all the tubes, and current indicating means in the plate circuit of the last tube.

In testimony whereof I affix my signature.

KENNETH H. GOODE.

CERTIFICATE OF CORRECTION.

Patent No. 1,843,320.                                Granted February 2, 1932, to

KENNETH H. GOODE.

It is hereby certified that error appears in the printed specification of the above numbered patent requiring correction as follows: Page 2, line 65, beginning with the comma and word "connection" strike out all to and including the syllable "ance" in line 73; same page, line 114, after the word "tubes" insert the comma and words , connection being made from a positive point on the battery to the filament circuit by means of a jumper, as is customarily practiced in the art. Any suitable filament voltage may be obtained by varying the jumper contact, and suitable resistors may be substituted for the original members in order to restore the circuit balance; and that the said Letters Patent should be read with these corrections therein that the same may conform to the record of the case in the Patent Office.

Signed and sealed this 29th day of March, A. D. 1932.

(Seal)                                                            M. J. Moore,
                                                                      Acting Commissioner of Patents.